Patented Aug. 11, 1931

1,818,403

UNITED STATES PATENT OFFICE

ALFRED JOSEPH, OF ENGHEIN, FRANCE, ASSIGNOR TO COMPAGNIE INTERNATIONALE POUR LA FABRICATION DES ESSENCES ET PETROLES, OF PARIS, FRANCE, A LIMITED JOINT STOCK COMPANY OF FRANCE

CARRIER FOR CATALYSTS AND THE LIKE

No Drawing. Application filed January 17, 1929, Serial No. 333,242, and in France January 23, 1928.

The subject of the present invention is a new product intended to form an inert carrier for catalytic or purifying agents, such as metals, oxides, or other metallic compounds in treatments wherein such bodies act either as contact substances which purely by their presence promote chemical reactions without participating therein, or as purifying materials or filters.

The new carrier can be utilized more especially with catalytic agents usually employed in synthetic operations, such as the synthesis of ammonia, manufacture of synthetic liquid fuels, etc.

The feature which characterizes this new product and its method of manufacture, is its particular constitution as a whole and a special method of preparation enabling a carrier to be obtained both consistently and suitably cellular for the reception, the lodgement and the retention of the catalytic or other agent.

The carrier substance is formed broadly of a mixture of clay, preferably china clay, and a binder such as mazut, with an addition of tar, to which mixture a suitably cellular constitution is imparted by the addition, before baking, of a finely divided organic or other substance, such as sawdust, for example, and which can be eliminated by baking.

The following is a practical example of this particular composition and of its method of preparation:

China clay, that is to say kaolin containing in the raw state the least possible free silica, is dried, then passed through a crushing mill and separator, this operation having for its object the reduction of the clay to a very fine powder and the elimination of the major portion of the free silica. On the other hand, the cell-generating material, that is to say fine sawdust is prepared as follows: It is previously riddled in such manner as to be freed of morsels of wood, stone, etc., then first air-dried, if it is very moist, and then stove dried until of constant weight. The dried sawdust is then sifted on a No. 20 sieve (20 meshes to the inch) and that which is rejected by such sieve is eliminated. All that has passed through the No. 20 sieve is then passed on to a No. 50 sieve (50 meshes to the inch), and the too fine particles passing through this sieve are eliminated, so that finally sawdust is obtained passing entirely through the 20 sieve and entirely refused by the 50 sieve.

About 2.300 kilogrammes of this sawdust are mixed with 4 kilogrammes of clay, prepared as above stated, in a mixer whereinto are progressively introduced, in thin streams, 4.600 litres of water until the formation of a paste to which is then added, continuing the mixing, 435 to 450 grammes of thick mexican mazut, mixed with fluid mazut or coal tar.

The perfectly homogeneous mixture thus obtained is passed into an extrusion press, from which it issues in the form of small hollow cylinders preferably of 6 millimetres outside diameter and 3 millimetres inside diameter, which are cut off in sections of 1 centimetre in length. These carrier units, received on plates or on a travelling belt, are dried in a stove. They are then baked in a furnace, in thin layers at a temperature varying between about 1200° and 1400° C., for ¼ hour in a purely reducing flame, in such manner as to effect the carbonization of the cell-generating material. Then, such carbonization having been effected, for about 10 minutes, always at the same temperature, the operation is effected in an oxidizing flame in such manner as to burn the carbon formed in the preceding operation and to eliminate it in the form of gas. There finally remains a very finely cellular ceramic material, eminently suitable for forming a carrier for catalytic or purifying agents which are incorporated therewith by known methods.

The absorptive power of the new carrier for a solution of nickel nitrate, at 35° Baumé for example, is about 125%.

The above precise compositions of the carrier substance before and after baking have, it will be understood, been indicated only by way of example. The principal characteristic of the invention resides in the combined employment of a plastic material, a binder and a finely divided filler of a character to disappear on the baking which converts the plastic material into ceramic material at the same time as it leaves therein fine cells for the subsequent reception and lodgement of the catalytic or purifying agent.

More especially the means for the elimination of the organic filler by consecutive bakings in reducing and oxidizing flames, also constitutes one of the features of the method of carrying out the invention.

Claims:

1. A product for forming a carrier for catalytic and purifying material comprising a mixture of plastic clay, Mexican mazut, and a finely divided organic filler.

2. A product for forming a carrier for catalytic and purifying material comprising a mixture of china clay, mazut, tar, and finely divided sawdust.

3. A method of manufacturing a carrier for catalysts and purifying agents which consists in mixing a plastic material with a finely divided organic filler, molding said mixture, baking said mixture in a reducing flame whereby said filler is carbonized, and then baking said mixture in an oxidizing flame.

4. The process of manufacturing a carrier for catalysts and purifying agents which consists in mixing a plastic clay with finely divided sawdust, molding said mixture, baking said mixture in a reducing flame whereby the sawdust is carbonized, and then baking the mixture in an oxidizing flame.

5. The process of manufacturing a carrier for catalysts and purifying agents which consists in mixing a plastic material with a finely divided organic filler, extruding the mixture into tubular form, cutting the extruded mixture into short lengths, and baking the tubular lengths to effect the conversion of the plastic material into ceramic material and the combustion of the organic material.

6. The process of manufacturing a carrier for catalysts and purifying agents which consists in mixing a plastic material with a finely divided organic filler, extruding the mixture into tubular form, cutting the extruded mixture into short lengths, baking the tubular lengths in a reducing flame, whereby the filler is carbonized, and then baking the tubular lengths in an oxidizing flame.

7. The process of manufacturing a carrier for catalysts and purifying agents which consists in mixing a plastic clay with finely divided sawdust, extruding the mixture into tubular form, cutting the extruded mixture into short lengths, baking the tubular lengths in a reducing flame, whereby the sawdust is carbonized, and then baking the tubular lengths in an oxidizing flame.

In testimony whereof I have signed this specification.

ALFRED JOSEPH.